Sept. 4, 1962  R. M. VAN HOUSE  3,052,224
SUPERCHARGING OF INTERNAL COMBUSTION ENGINES
Filed July 18, 1960  3 Sheets-Sheet 1

INVENTOR.
Robert M. Van House
BY
E. W. Christen
ATTORNEY

Sept. 4, 1962  R. M. VAN HOUSE  3,052,224
SUPERCHARGING OF INTERNAL COMBUSTION ENGINES
Filed July 18, 1960  3 Sheets-Sheet 2

INVENTOR.
Robert M. Van House
BY
E. W. Christen
ATTORNEY

United States Patent Office 3,052,224
Patented Sept. 4, 1962

3,052,224
SUPERCHARGING OF INTERNAL
COMBUSTION ENGINES
Robert M. Van House, Royal Oak, Mich., assignor to
General Motors Corporation, Detroit, Mich., a corporation of Delaware
Filed July 18, 1960, Ser. No. 43,388
2 Claims. (Cl. 123—1)

This invention relates to supercharging of internal combustion engines and more particularly to a method of supercharging an internal combustion engine to decrease the tendency of an engine to detonate.

In internal combustion engine applications it may or may not be desirable to supercharge to obtain the usual advantages of power boost. The present design trend in internal combustion engines for automobiles is in the direction of increased engine size and available power to provide an engine suitable for driving the automobile under all conditions of operation. This may be considered an inefficient approach when it is recognized that sufficient power must be available at all times, though not necessarily used, for situations arising when high power is required, such as hill climbing or acceleration. The automobile generally is not operated under these conditions, the majority of the engine operation taking place under normal driving conditions where the periods of high power are not needed. Having the large engine to keep this seldom used power available causes an increase in fuel consumption, due to the greater weight and large size of the engine, necessary to accomplish the purpose.

Automobile manufacturers are presently taking advantage of the higher octane fuels now available and of the increase in engine compression ratios that are made possible by advances in engine design. This may provide improved efficiency of the engine, but does not decrease the fuel consumption in the present large-sized internal combustion engines.

In applying supercharging principles to automobile type internal combustion engines it should be possible to provide a small engine, capable of adequate operation during normal driving conditions, and supercharge the engine during periods of peak power demand to obtain the added power needed. The smaller engine would permit a reduced cost of the vehicle as a whole, as well as provide better performance of the engine, a decrease in fuel consumption and an increase in miles per gallon of fuel.

A major consideration in the design and manufacture of engines is the problem of detonation. This occurs in normal engines and in engines supercharged in the usual manner and has never been effectively or efficiently eliminated. One of the reasons for this is that the detonation characteristics of the engines and fuels have never been completely evaluated, because of the limited knowledge of the fuels themselves, and because of the low compression ratios that have been used in the past.

In past methods of supercharging internal combustion engines, attempts to suppress detonation have been inefficient. Rather than design the engine in the direction of detonation suppression, the manufacturers have reduced compression ratios and, consequently, engine efficiency to permit supercharging without detonation. Furthermore, such supercharging devices consume engine power in compressing the supercharging air, putting an added burden on the engine and taking away from the available usable power of the engine. Such supercharging systems also provide for supercharging at the beginning of the compression stroke of the engine, which has been felt necessary in order to provide the proper compression pressures and temperatures to suitably supercharge the engine.

It is here proposed to provide internal combustion engine supercharging through the use of an accumulator, or high pressure air tank, and to use such a supercharging method with a small internal combustion engine which is suitable for normal operating conditions. A third valve mounted in the cylinder head, and communicating directly with the combustion chamber, permits the supercharged air to be introduced directly into the combustion chamber, rather than through the inlet manifold as has been the practice in the past. The third valve may be provided with a variable timing device to permit the injection of supercharged air at any point during the compression stroke of the piston, providing the proper compression pressures and temperatures for optimum operation of the engine. The timing of the third valve is dependent on the type of fuel used, the temperature and pressure of the air that is available from the accumulator, the compression ratio of the engine and the amount of boost required. The operating mechanism for the third valve timing device may be integrated with the normal carburetor control linkages. This would permit the engine to operate with a normal carburetor device during the usual operating conditions and to operate fully supercharged during periods of peak power demand.

This type of supercharging introduces the compressed air into the combustion chamber late in the compression stroke of the engine piston. This results in lower compression temperatures and pressures and requires less work to compress the supercharged air in the cylinder.

Several advantages become available from this type of engine supercharging. Foremost is the suppression of detonation in the engine. This is possible because of the lower combustion chamber temperatures, the reduced amount of work required to compress the supercharged air and the shorter duration of time that the air is at a high temperature and high pressure in the hot engine cylinder. Further, the injection of high pressure compressed air creates a great amount of turbulence in the combustion chamber, providing a more complete mixing of the air and fuel, thus aiding in spreading the flame front in a much faster manner.

The net result of accumulator supercharging of this type is an internal combustion engine having a greater efficiency for use in an automobile. This is permissible because the engine may be of optimum size for normal operating conditions and may be supercharged for added power requirements during periods of peak power demand. Because of the possibility of using high compression ratios, and since the engine will normally be operating at a high load factor, and because of the lesser weight of the engine, there will be a decrease in fuel consumption, reflected in the miles per gallon that is so important to the vehicle operator. The smaller engine permits better performance of the vehicle, as well as a greatly reduced cost of the engine and the vehicle, when compared to present day large, unsupercharged engines.

These and other advantages will become more apparent from the following description and drawings in which.

Figure 1:
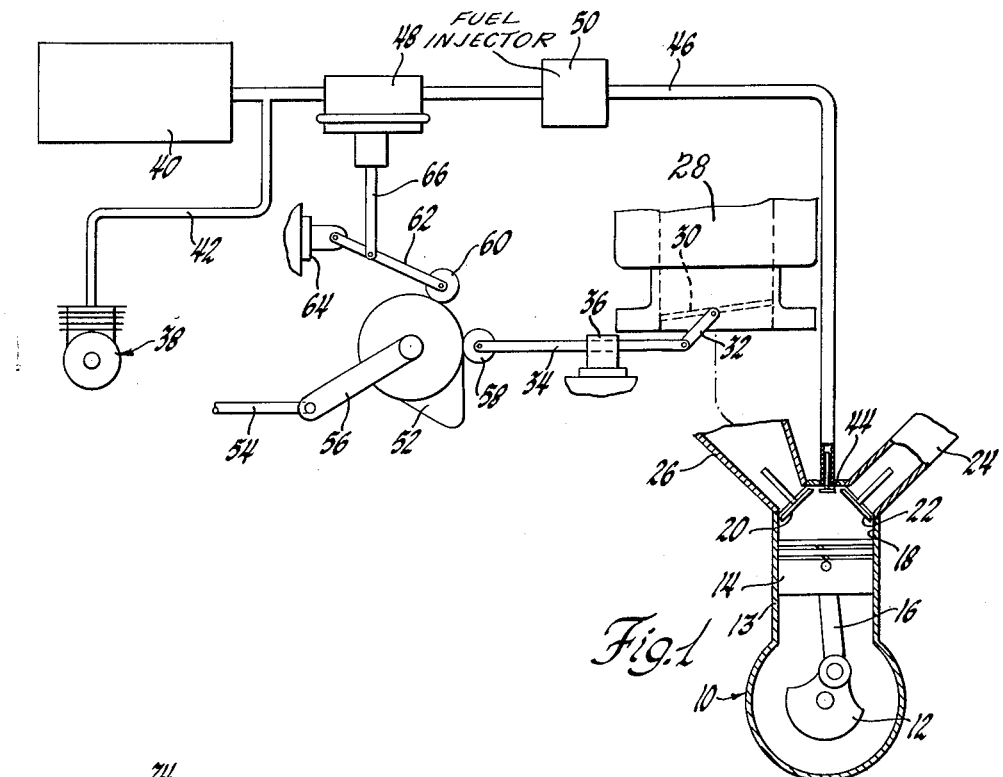
FIGURE 1 is a schematic view of a system for accumulator supercharging in accordance with the proposed method, illustrating an engine having the usual intake and exhaust valves and carburetor system and provided with the third valve and accumulator system for supercharging.

Referring more particularly to the drawings, a brief description of the system illustrated in FIGURE 1 will aid in the understanding of the accumulator supercharging system. An engine, illustrated generally by the numeral 10, is shown having the usual crankshaft 12, cylinder 13, piston 14, and piston rod 16. A combustion chamber 18 is provided, into which the usual intake valve 20 and exhaust valve 22 communicate. An exhaust manifold 24 conveys the exhaust gases to a suitable construction for conveying such exhaust gases to the atmosphere. An inlet manifold 26 is shown communicating with a conventional carburetor 28 having a throttle valve 30 mounted therein for operation of the engine during normal conditions. The throttle valve 30 is controlled by a link 32 attached to a control rod 34, the control rod being suitably mounted in the vehicle, as at 36.

For supercharging the engine 10, a compressor 38 may be provided to supply air under pressure to an accumulator or storage tank 40 through suitable conduit means 42. The compressor may be driven in any suitable manner, as by the crankshaft 12. The accumulator 40 communicates with a third valve 44 located in the engine 10 and opening directly into the combustion chamber 18 through a conduit 46. A conventional pressure regulator 48 may be located in conduit 46, and a suitable fuel injector or pressurized carburetor 50 may be provided to mix fuel with the compressed air from the accumulator 40.

In this method of accumulator supercharging, it may be desired to provide normal aspiration of the fuel air mixture through the carburetor 28 during normal operation of the engine. During periods of peak power demand, it may be desirable to shut off the carburetor 28 and operate the engine on the compressed air from the accumulator 40 and through the third valve 44. If this is required, a suitable cam 52, rotated by the accelerator pedal linkage 54 and link 56, may serve to close the throttle valve 30 and open the compressed air conduit 46. A cam follower 58, mounted on link member 34, and a cam follower 60, mounted on a link 62, are actuated by cam 52. Link 62 is secured to the vehicle as at 64 and has the pressure regulator control rod 66 secured thereto.

The profile of cam 52 is such that the throttle valve 30 may be completely closed when the compressed air line 40 is completely open and the throttle valve 30 may be completely opened when the compressed air line 46 is completely closed. The profile of cam 52 may also be such that any degree of opening of the carburetor throttle valve 30 may be combined with any degree of opening of the compressed air line 46 if desired.

During normal operation of the engine, it is desirable for the third valve 44 to be closed so that normally aspirated air and fuel entering the combustion chamber 18 through the intake valve 20 will not be discharged into the compressed air line 46. Furthermore, during supercharging operation of the engine it is desirable for the third valve 44 to open at the desired point in the compression stroke of the piston 14. To accomplish these results, a third valve control mechanism may be used, as illustrated in FIGURES 2 and 3.

Figure 2:
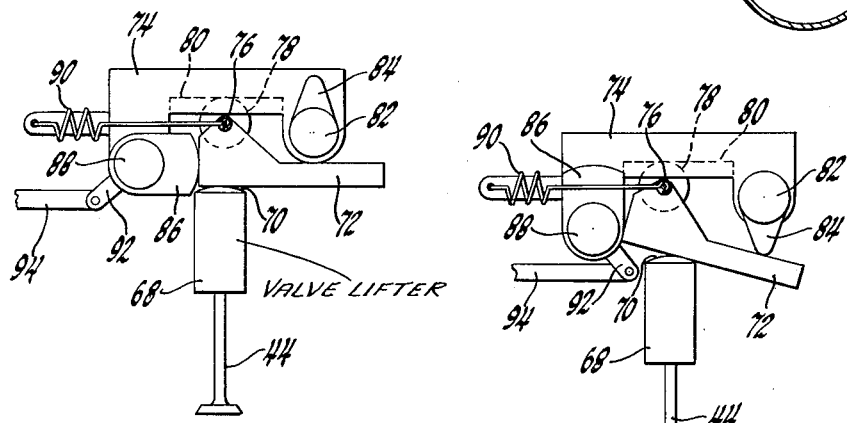
FIGURE 2 is a view of a third valve control mechanism for the system shown in FIGURE 1, the mechanism being illustrated in one position of operation.

FIGURE 2 illustrates the position of the various parts of the mechanism during normal operation of the engine when no supercharging is required. The valve 44 has a suitable valve lifting device, such as a hydraulic lifter 68 mounted thereon, the valve lifter having a spherical surface 70 formed on the upper end thereof. A valve actuating arm 72 is in contact with the valve lifter at the spherical surface 70 and is pivoted about mounting bracket 74 by a pivot pin 76. The pivot pin 76 is secured to a roller, or wheel, 78, which is adapted to ride in a groove 80 formed in the bracket 74. The actuating arm 72 is driven by a camshaft 82, which in turn is rotated in any suitable manner by the engine crankshaft 12. A cam 84 is mounted on the camshaft 82 and is adapted to engage the actuating arm 72 for reciprocation thereof.

To prevent the third valve 44 from opening during low throttle operation of the engine, a control cam 86 pivotally mounted at 88 on the bracket 74 pushes the actuating arm 72 and roller 80 to the right, as viewed in FIGURE 2, thus placing the centerline of the pivot 76 over or to the right of the centerline of the valve 44. Thus, when the cam 84 moves the actuating arm 72 in a downward direction, no movement of the valve 44 will take place since the actuating arm 72 rotates over the spherical surface 70 of the valve lifter 68. This permits the roller 78 to move to the right, as viewed in FIGURE 2, against the force of a biasing spring 90. In this position of the control cam 86, the constant rotation of the camshaft 82 and cam 84 will not cause the third valve 44 to open into the combustion chamber 18.

Figure 3:
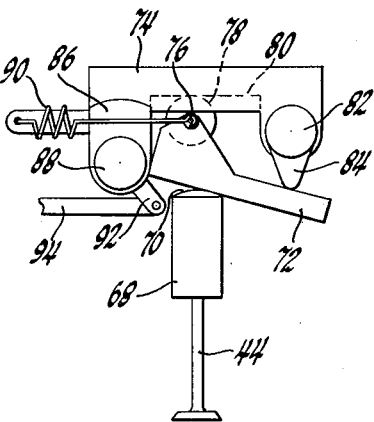
FIGURE 3 is a view of the third valve operating mechanism shown in FIGURE 2 and illustrated in a second position of operation.

FIGURE 3 illustrates the position of the parts of the third valve control mechanism during conditions of supercharged operation of the engine 10. The control cam 86 is rotated to the position shown about the pivot 88, permitting the roller 78 and the actuating arm 72 to be moved to the left, as viewed in FIGURE 3, through the action of the biasing spring 90. In this position of operation, the centerline of pivot 76 is disposed to the left of the centerline of the valve 44 and the rotation of cam 84 by the camshaft 82 causes the actuating arm 72 to move the valve 44 downwardly, opening the valve into the combustion chamber 18. The control cam 86 may be controlled by link members 92 and 94, suitably attached to the carburetor throttle control 54, 56, in FIGURE 1, for operation in conjunction therewith, or may be controlled by any other well known means.

In accordance with this method of accumulator supercharging, the optimum timing of the third valve during conditions of supercharging is such that the valve be permitted to open somewhere in the latter part of the compression stroke of the piston, and set to close in the neighborhood of top dead center of the piston at the end of the compression stroke. A valve opening of 68° before top dead center to 2° before top dead center has been found to provide a suitable period of time for the compressed air to enter the combustion chamber 18 and to be further compressed by the piston 14 without greatly increasing the temperature in the combustion chamber and without eliminating the turbulence created by the charge of air. Also, timing of from 38° before top center to 3° after top center and 90° before top center to 20° before have been found acceptable. With introduction of air to the combustion chamber in the latter part of the compression stroke, the tendency of the engine to detonate is greatly decreased and the engine is more efficiently operated.

In providing accumulator supercharging in accordance with this method of operation, there are a number of desirable qualifications. First, the supercharger should be able to supply air to boost the intake manifold pressure by more than two atmospheres at any engine speed. Secondly, the supercharger should not impose an inertia load on the engine during acceleration, or other period of peak power demand. Third, the supercharger should not absorb high engine power during periods of peak power demand. Further, it is desirable that the air supplied to the engine by the supercharger must be cold, and finally, the road load efficiency of the engine must not be seriously impaired by the supercharger. The accumulator method of supercharging meets the qualifications desired.

The accumulator and the compressor are designed to build up an amount of compressed air in the accumulator to supply air to the combustion chamber at sufficient pressure to boost the manifold pressure by more than two atmospheres at any engine speed. The compressor is so designed as to require a small amount of power from the engine during normal operation thereof, in order to build up the supply of air in the accumulator. This would be insignificant during periods of peak power demand and the major work done by the air compressor would take place during normal operating conditions of the engine and the vehicle. Nor would the compressor absorb high amounts of engine power during periods of peak power demand for the same reasons. The expansion of the air from the accumulator to the combustion chamber provides a combustion chamber temperature of the air proportionate to the pressure and temperature of the air in the accumulator. Finally, since the air compressor draws so little power from the engine in order to recharge the accumulator, the road load efficiency of the engine is relatively unimpaired.

Figure 4:
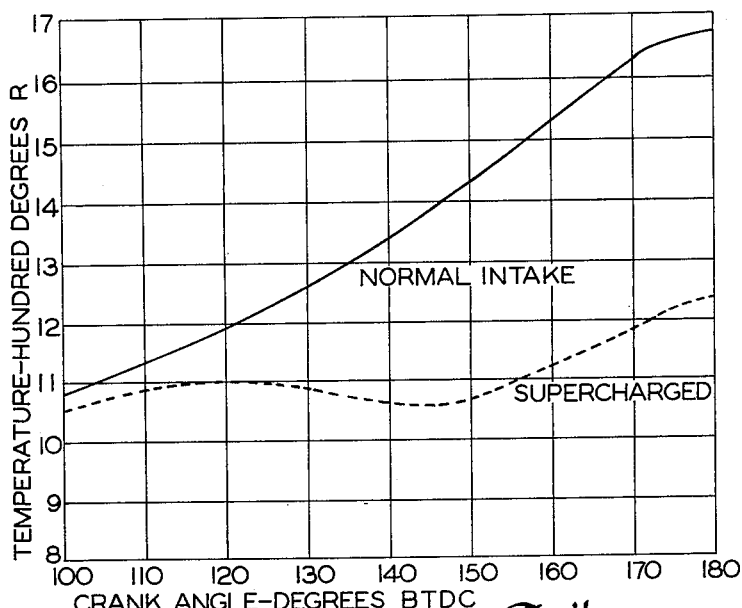
FIGURE 4 is a graph showing curves of crankshaft rotation versus cylinder temperature, illustrating the operation of the accumulator supercharging method.
Figure 5:
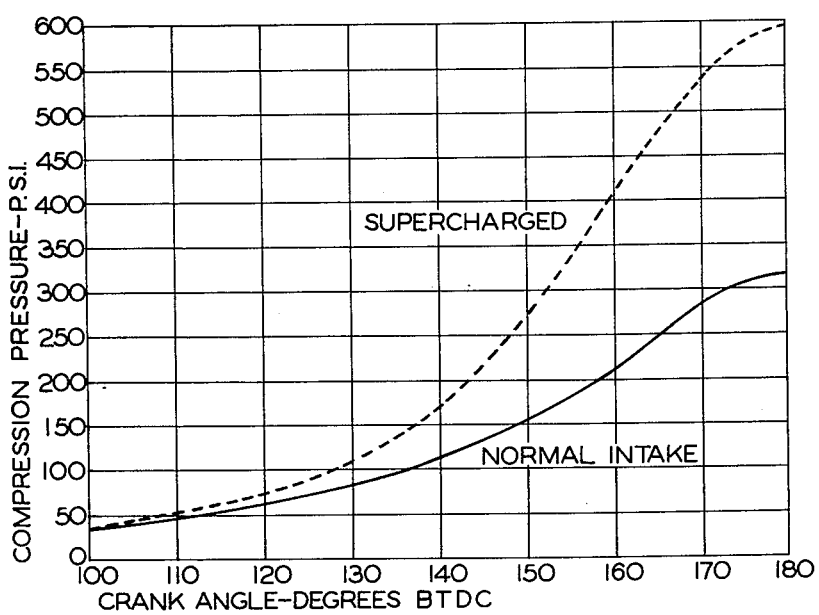
FIGURE 5 is a graph showing curves of crankshaft rotation versus compression pressure, illustrating the operation of the accumulator supercharging method.

FIGURES 4 and 5 are graphs of crankshaft rotation versus temperature and crankshaft rotation versus compression pressure, respectively. These curves have been determined from calculations conducted relative to suitably supercharged engines. One curve in each figure illustrates the effect of normal intake and the other curve illustrates the effect of supercharging late in the compression stroke on the temperature and compression pressure in the combustion chamber of the engine. These curves were determined from an engine which had a compression ratio of approximately 10.0:1 and the temperature of the air in the accumulator was approximately 140° F. Engine speed was taken at 2800 r.p.m. and the polytropic exponent was 1.25. The effect of this information will be hereinafter described.

As an example, the following illustrates the size of the accumulator that might be used, and the requirements of the compressor for charging such an accumulator. It is known that an engine uses approximately six pounds of air per horsepower per hour. A one-half cubic foot accumulator of air at 3,000 p.s.i.a. and 140° F. will contain 6.75 pounds of air. If this air is discharged rapidly to 100 p.s.i. and a temperature of approximately 255° R., 6.22 pounds of air will have been consumed. This is enough air to boost a 100 H.P. engine to 250 H.P. for about 25 seconds. The air compressor, absorbing a peak of 4.6 horsepower, can completely recharge an accumulator of this size in a period of twenty-one minutes. This amount of air and a compressor of this size should be capable of providing air for any series of accelerations likely to be encountered in a normal passenger vehicle. Obviously, a smaller engine will require proportionately smaller equipment.

As previously stated, the main advantage of accumulator supercharging by this method is in the detonation suppression characteristics that permit greater efficiency of the engine and the possibility of using varied types of fuels and better compression ratios. The detonation characteristics of a fuel at a particular temperature and pressure, and at a particular density of fuel-air mixture, can be predicted by comparing the fuel with known data for known fuels.

Figure 6:
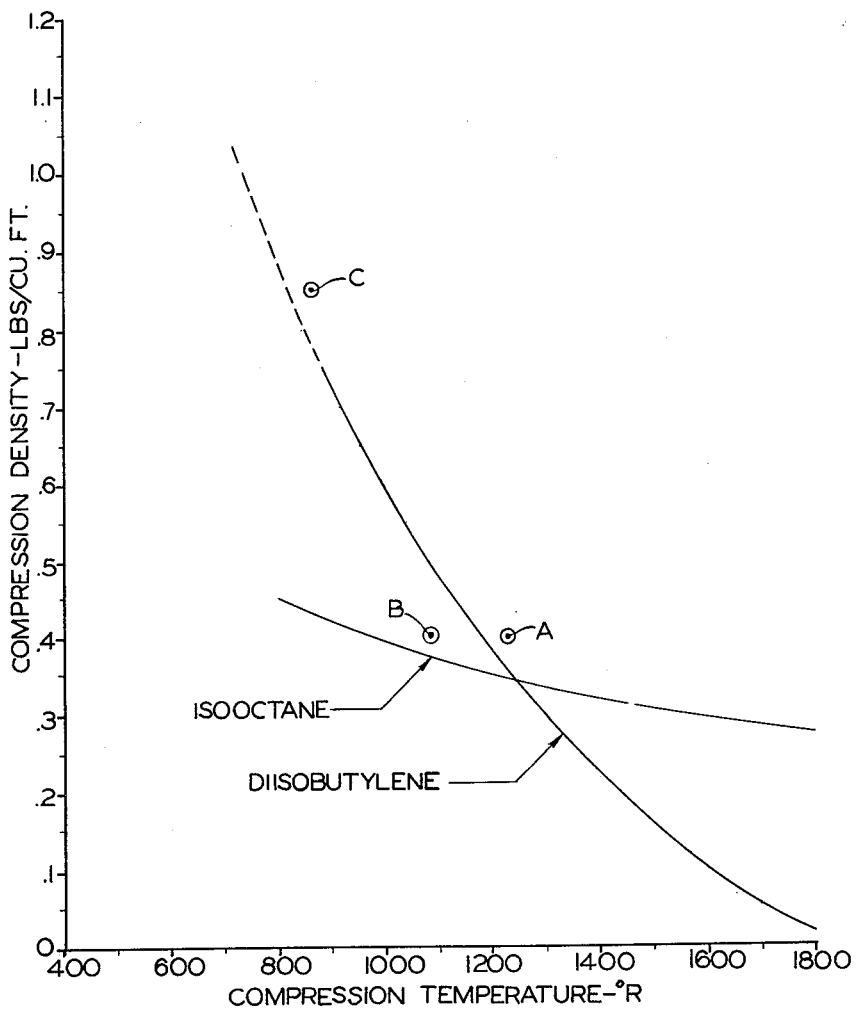
FIGURE 6 is a graph showing curves of compression temperature versus compression density of the air fuel mixture of two types of fuels, illustrating the operation of the accumulator supercharging method of operation.

FIGURE 6 illustrates compression temperature and compression density curves for two fuels, the fuels being isooctane and diisobutylene. The octane ratings for isooctane fuel, as measured by the well-known Research and Motor methods, by definition, 100. Diisobutylene rates 105.3 by the Research method and 88.6 by the Motor method. Both diisobutylene and present automotive fuels are known as sensitive fuels, that is, they become much more liable to detonate in an engine as compression temperatures increase. Isooctane is known as an insensitive fuel and has less tendency to detonate as compression temperatures increase. There is no reliable data available on the sensitivity of present automobile fuels, but it is known that its sensitivity is much more similar to diisobutylene than to isooctane. In referring to the curves illustrated in FIGURE 6, if the temperature and compression density combination of an automotive fuel is above the diisobutylene curve, as point A, the engine will detonate. By lowering the compression temperature in the engine, as to point B, the compression temperature-compression density combination will fall below the diisobutylene curve and the tendency to detonate will be decreased. Further, by lowering the compression temperature it is possible to increase the air-fuel mixture, or compression density and retain a similar relationship with respect to the diisobutylene curve, as point C.

In accordance with the present method of accumulator supercharging, FIGURE 4 illustrates the result of delayed intake supercharging on the compression temperature. The curve labeled "Normal Intake" illustrates the effect of temperature, in degrees Rankin, of normally aspirated air-fuel mixture introduced into the engine beginning at approximately bottom dead center of the piston. It is seen that at the top dead center of the piston the combustion chamber temperature is in the neighborhood of 1675° R. The bottom curve of FIGURE 4 illustrates the effect of supercharged air entering the combustion chamber at approximately 100° from bottom dead center, and it may be seen that the combustion chamber temperature at top dead center is approximately 1243° R.

FIGURE 5 illustrates the effect of supercharged air in the combustion chamber with respect to the pressure in the combustion chamber, in pounds per square inch absolute, at various degrees of crankshaft rotation from bottom dead center. The lower curve entitled "Normal Intake" shows the combustion chamber pressure at top dead center as being approximately 310 p.s.i. The upper curve of FIGURE 5 shows supercharged air entering the combustion chamber at approximately 100° from bottom center and having a pressure of 590 p.s.i. at top dead center.

These curves graphically illustrate the knock suppression characteristics of this method of accumulator supercharging. Compression temperatures are greatly decreased, providing a considerable suppressing effect on detonation. It may further be noted that the later the introduction of the compressed air in the combustion chamber, the less amount of time that the air-fuel mixture is held at a high pressure and a high temperature in the hot combustion chamber, further decreasing the tendency of the engine to detonate. Furthermore, the turbulence created in the combustion chamber by the burst of compressed air will aid in suppressing detonation by improving the flame travel and the burning of the mixture.

The foregoing description illustrates a method of supercharging an internal combustion engine of a type and size that may be used in an automobile. The smaller engine makes possible a greater economy to both the manufacturer and the user, and provides sufficient power for all conditions of operation. The objectionable detonation of the engine is eliminated and the adaptability of the engine to low octane fuels permits better fuel consumption characteristics and more efficient operation.

What is claimed is:
1. A method of operating an internal combustion engine to suppress detonation during periods of peak power demand, said engine having a cylinder and a piston reciprocably mounted therein and defining an expansible chamber therebetween, said method including the steps of accumulating air under pressure in an accumulator during normal operation of said engine, instantaneously conveying air from said accumulator to said engine for periods of power demand greater than normally attainable from said engine, and introducing said air into said expansible chamber at relatively high pressure and low temperature during the latter half of the compression stroke of said piston in said engine.

2. A method of operating an internal combustion engine to suppress detonation during periods of peak power demand, said engine having a cylinder and a piston reciprocably mounted therein and defining an expansible chamber therebetween, said method including the steps of compressing air, storing said compressed air during periods of normal operation of said engine, instantaneously conveying said air to said engine for periods of power demand greater than normally attainable from said engine and introducing said air to said expansible chamber at relatively high pressure and relatively low temperature during a portion of the latter half of the compression stroke of said piston in said cylinder.

References Cited in the file of this patent
UNITED STATES PATENTS

| | | |
|---|---|---|
| 1,781,147 | Zaikowsky | Nov. 11, 1930 |
| 2,112,751 | Thomas | Mar. 29, 1931 |
| 2,773,490 | Miller | Dec. 11, 1956 |